United States Patent [19]

Chua et al.

[11] 4,309,490
[45] Jan. 5, 1982

[54] LONG LIFE THIONYL CHLORIDE CELL

[75] Inventors: David L. Chua, Horsham; William C. Merz, Aldan, both of Pa.

[73] Assignee: Honeywell Inc., Minneapolis, Minn.

[21] Appl. No.: 731,064

[22] Filed: Oct. 8, 1976

[51] Int. Cl.$^3$ ............................................. H01M 6/14
[52] U.S. Cl. ................................... 429/101; 429/194; 429/199
[58] Field of Search ............... 429/104, 101, 105, 188, 429/194, 199, 218

[56] References Cited

U.S. PATENT DOCUMENTS 3,578,500  5/1971  Maricle et al. ...................... 429/194
3,891,458  6/1975  Eisenberg ............................ 429/218

Primary Examiner—Anthony Skapars
Attorney, Agent, or Firm—Albin Medved

[57] ABSTRACT

An electrochemical cell having substantially longer storage life comprising a lithium anode, a thionyl chloride depolarizer and solvent, a lithium aluminum chloride electrolyte salt and a quantity of sulfur dioxide admixed in the solvent in an amount sufficient to regulate the growth of lithium chloride crystals formed on the lithium anode. This amount of sulfur dioxide is preferrably sufficient to cause the ratio of moles of lithium aluminum chloride to moles of sulfur dioxide to range from 0.9 to 1.5. A most preferred range is from 1.0 to 1.2.

4 Claims, No Drawings

LONG LIFE THIONYL CHLORIDE CELL

ORIGIN OF THE INVENTION

This invention was made in the course of a contract with the Department of the Air Force.

BACKGROUND OF THE INVENTION

Electrochemical cells having a lithium anode have become increasingly important to battery technology as the search for additional sources of energy continue. Lithium, due to its extremely high electrochemical potential, can and often times does find itself paired with a depolarizer or cathode material in an electrochemical cell to produce potentially superior cells and batteries.

With the evolution of the lithium battery has come the desire to employ liquid depolarizers. These liquid materials have a high degree of mobility, thereby offering the potential of complete utilization of that material. In addition, the open circuit voltage between soluble or liquid depolarizers and lithium is extremely high. Thus, interest has focused on what appears to be a potential source of a relatively high amount of energy at a relatively high potential.

While a number of potential candidates have been proposed as depolarizers for use with lithium, several materials, notably sulfur dioxide and thionyl chloride have become the subject of substantial development due to their many advantageous properties. U.S. Pat. No. 3,578,500 discloses sulfur dioxide batteries in which one or more of the cosolvent potentially available to that cell is thionyl chloride. U.S. Pat. No. 3,891,457 teaches the use of thionyl chloride itself as a depolarizer in combination with certain cathode collector designs. In addition, U.S. Pat. No. 3,891,458 teaches the use of thionyl chloride as a cathodic depolarizer as well as a solvent in a system. The patent further discloses that in high rate applications, electrolytes using pure thionyl chloride as a solvent fail to yield high coulombic efficiencies when combined with lithium anodes. Increased cell capacities and efficiencies are disclosed employing the first solute or salt comprising a salt of the selected anode metal in combination with a second solute of a compound selected from the group consisting of phosphoryl chloride, sulfolane, sulfur dioxide and mixtures thereof. Improvements in cell capacity over a basic single salt solute cell having approximately 2.46 ampere hours are disclosed wherein up to 4.1 ampere hours of capacity are achieved. In each of these cases, a substantial quantity of the second solute is added which appears to materially increase the capacity of the cell.

As efforts continue to bring cells from the laboratory to the market place, however, certain difficulties have been incurred which have prevented lithium-thionyl chloride cells from reaching a significant number of commercial applications. This is particularly true in primary active batteries, which are, of course, those cells which are used once and are ready to discharge current from their time of manufacture. Unfortunately, few cells are taken directly from the assembly line to the device for which they are intended. The marketing process alone is normally responsible for long periods of delay between the initial manufacture of the active cell and its ultimate use. Moreover, cells are not purchased merely when they are needed, but, conventionally, are purchased well in advance of their need. Thus, the "shelf life" of a cell becomes a prime factor in its utility as an electrochemical primary active cell.

One of the problems that occurs with lithium-thionyl chloride cells is the build up of byproducts of the lithium anode. Specifically, during storage of lithium metal in contact with thionyl chloride as is the case in primary active cells, a nonelectronically conductive film of lithium chloride grows on the lithium surface. This film-forming reaction occurs as part of the overall electrochemical reaction in a manner similar to that during discharge. Specifically, at the anode, the lithium metal ionizes to produce electrons. At the cathode, or the thionyl chloride, electrons combine with the thionyl chloride to form sulfur, sulfur dioxide and chlorine ions. The lithium ions and the chlorine ions form a lithium chloride film which is insoluble and prevents further attack of the lithium by the thionyl chloride. However, this nonconductive film prevents the cell from operating at its normal voltage during the initial stages of cell discharge. This growth of apparently amorphous lithium chloride on the lithium anode takes place over a period of time. The longer a cell is stored prior to use, the greater the build up and the more difficult it is to operate the cell. This difficulty in operating the cell is particularly true when the cell is employed in a system which requires a high current drain. Low loads in the order of less than 1 or 2 mA/sq. inch of electrode area are not as severely affected by long storage as are situations where a relatively high current drain is initially required during use of the cell. In some circumstances, the cell is completely useless after long storage whereas a fresh cell can readily supply the current desired.

SUMMARY AND DESCRIPTION OF THE INVENTION

It has now been discovered that lithium-thionyl chloride cells can be prepared which can be stored for extended periods of time and which are still capable of providing operation at useful voltages the instant the unit is put into use. Specifically, it has been discovered that thionyl chloride cells can achieve substantially longer storage life if the cells include a lithium chloride growth regulating amount of sulfur dioxide in the electrochemical cell. The cell itself includes a lithium anode, a thionyl chloride depolarizer and solvent, an electrolyte salt comprising lithium aluminum chloride, and an amount of sulfur dioxide which inhibits the growth of lithium chloride on the anode. More particularly, it has been found that the sulfur dioxide causes crystalline lithium chloride to be formed on the anode in situ during storage which does not prevent the use of the cell under high load conditions after such long storage.

The amount of sulfur dioxide employed in a cell of this invention is that amount which is sufficient to regulate the growth of the lithium chloride and to insure that crystalline lithium chloride is formed. The amount of sulfur dioxide should be based upon the amount of lithium aluminum chloride used as an electrolyte salt in the cell. Specifically, the ratio of the moles of lithium aluminum chloride to moles of sulfur dioxide should range from approximately 0.9 to approximately 1.5. A preferred range of this ratio is from about 1.0 to about 1.2. Typically, in a system which employs a 1.5 molar solution of lithium aluminum chloride in thionyl chloride, approximately 5% by weight of sulfur dioxide, based on the weight of the thionyl chloride, will permit operation of the cells after long term of storage.

To demonstrate the efficiencies of the present invention, a number of cells were prepared. In each cell, there was a lithium anode, a thionyl chloride depolarizer and solvent, and an electrolyte salt comprising lithium aluminum chloride. A conventional carbon cathode collector was employed and all of the cells were identical in size and shape.

One fourth of the cells were designated as base or standard cells, and contained no sulfur dioxide. A second fourth of the cells additionally contained 1.3125 moles of sulfur dioxide (about 5% by weight, based on the thionyl chloride) for every 1.5 moles of lithium aluminum chloride. This amount of sulfur dioxide gave a ratio, R, of the moles of lithium aluminum chloride to moles of sulfur dioxide of approximately 1.14. The third and fourth groups of cells additionally contained sulfur dioxide to give ratios, R, of 0.57 and 0.28 respectively. These last two groups of cells represented the use of 10% and 20% by weight sulfur dioxide, based upon the weight of thionyl chloride. In all cells, a 1.5 molar solution of lithium aluminum chloride was used.

Representative cells from each of the four classes were then tested substantially immediately after manufacture. The cells were subjected to a cyclic load of 120 mA for 30 minutes followed by a 45 mA load for 30 minutes, making the total time for one cycle of one hour. Fresh cells from each category were capable of operating for approximately 16 hours, regardless of the amount of sulfur dioxide added.

A second sample of cells from each group was then stored at 165° F. for one month. It is generally an accepted fact that high temperature storage accelerates aging affects and can be compared to storage at lower temperatures for substantially longer periods of time. 165° F. has been selected since it is the upper range of the temperature range proscribed by the military operability of cells.

After one month storage at 165° F., each of the four types of cells were tested. Specifically, the cells were subjected to a 5.0 mA load per sq. centimeter of electrode area. The open circuit voltage and the voltage immediately after application of the load was measured. As shown in Table I below, the cells all exhibited an open circuit voltage of about 3.7 volts, which is to be expected. However, only that cell which had a ratio of the moles of lithium aluminum chloride to moles of sulfur dioxide of 1.14 was capable of supplying a voltage to the load. Specifically, 3.3 volts was measured initially on that cell when subjected to a load. The cells containing no sulfur dioxide and the cells containing substantially more sulfur dioxide were inoperative.

TABLE I

| Storage at 165° for One Month 5.0 mA/cm² Load on Cell | | | | |
|---|---|---|---|---|
| Moles LiAlCl$_4$ | Moles SO$_2$ | R | O.C.V. | Initial Load V. |
| 1.5 | 0 | — | 3.7 | 0 |
| 1.5 | 1.3125 | 1.14 | 3.7 | 3.3 |
| 1.5 | 2.625 | 0.57 | 3.7 | 0 |
| 1.5 | 5.25 | 0.28 | 3.7 | 0 |

Yet another group of these four groups of cells were stored at 165° F. for four months. Upon completion of the storage period, the cells were subjected to the aforementioned load cycle of 120 mA for 30 minutes plus 45 mA for 30 minutes. The cycle was repeated until the cell was depleted. The results of these tests are presented in Table II.

TABLE II

| Storage at 165° F. for Four Months 120 mA 30 Minutes Plus 45 mA 30 Minutes Load Cycle Repeated Until Depletion | | | | | |
|---|---|---|---|---|---|
| Moles LiAlCl$_4$ | Moles SO$_2$ | R | Initial Voltage | Rise Time to Reach 2.0 V | Time to Depletion |
| 1.5 | 0 | — | 0 | 1.5 hr. | 12.25 hr. |
| 1.5 | 1.3125 | 1.14 | 1.3 | 0.25 hr. | 15.0 hr. |
| 1.5 | 2.625 | 0.57 | 0 | 5.5 hr. | 14.0 hr. |
| 1.5 | 5.25 | 0.28 | 0 | 5.5 hr. | 15.0 hr. |

As can be seen from the data shown in Table II, only that cell which had a ratio of the moles of lithium aluminum chloride to moles of sulfur dioxide of about 1.14 was capable of delivering any initial voltage under the load cycle. The cell was capable of reaching a minimal amount of voltage, 2.0 volts, in 15 minutes or 0.25 hr. Neither the cell containing no sulfur dioxide nor the cells containing excess amounts of sulfur dioxide were capable of providing an initial voltage. In the case of the cell containing no sulfur dioxide, approximately 1.5 hours was necessary to reach a voltage of 2.0 volts. Both of the cells having more sulfur dioxide required 5.5 hours to reach 2.0 volts. Operation of the load cycle was continued until the cells were depleted. Although useful energy was obtained towards the end of the test, none of the cells other than that built according to the present invention were capable of performing the required function, namely operation over the full series of test cycles.

While this invention has been disclosed with particular reference to the preferred embodiments, it will be understood by those skilled in the art that changes in the form and details may be made without departing from the spirit and scope of this invention.

The embodiments of the invention in which an exclusive property or right is claimed are defined as follows:

1. An electrochemical cell, comprising:
    a lithium anode;
    a thionyl chloride depolarizer and solvent;
    an electrolyte salt comprising lithium aluminum chloride; and
    a quantity of lithium chloride growth regulating sulfur dioxide admixed with said solvent in an amount such that the ratio of the moles of lithium aluminum chloride to moles of sulfur dioxide ranges from 0.9 to 1.5.

2. The electrochemical cell of claim 1 wherein the amount of sulfur dioxide is such that the ratio of moles of lithium aluminum chloride to moles of sulfur dioxide ranges from 1.0 to 1.2.

3. In an electrochemical cell having a lithium anode, a thionyl chloride depolarizer and solvent, and an electrolyte salt comprising lithium aluminum chloride, the improvement comprising:
    an amount of lithium chloride growth regulating sulfur dioxide added to said cell to provide a ratio of moles of lithium aluminum chloride to moles of sulfur dioxide ranging from 0.9 to 1.5.

4. The electrochemical cell of claim 3 wherein the amount of sulfur dioxide is sufficient to give a ratio of moles of lithium aluminum chloride to moles of sulfur dioxide ranging from 1.0 to 1.2.

* * * * *